Feb. 29, 1944.   C. E. JOHNSON ET AL   2,342,941
ENCLOSED VARIABLE SPEED TRANSMISSION
Filed April 9, 1941   2 Sheets-Sheet 1
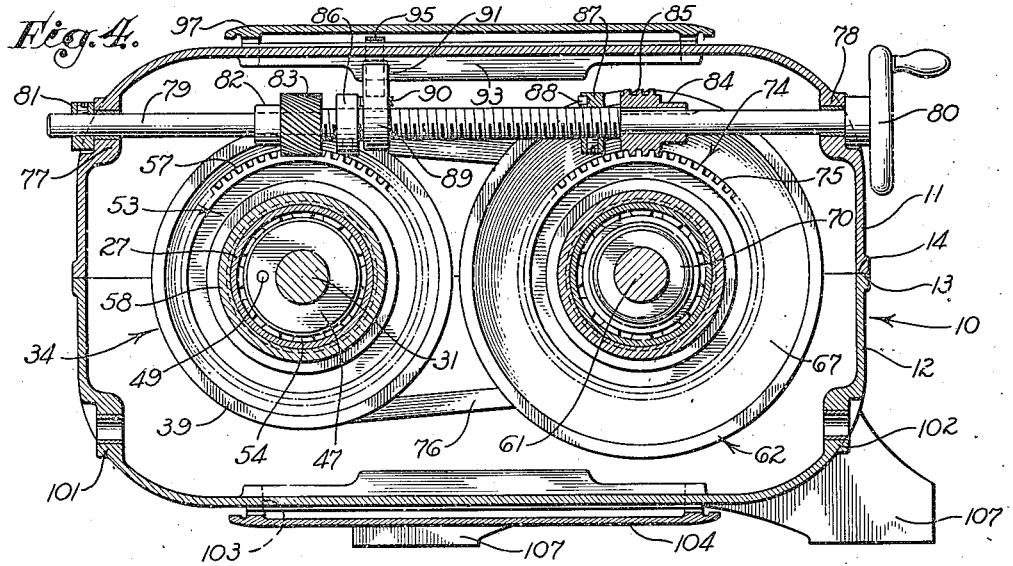
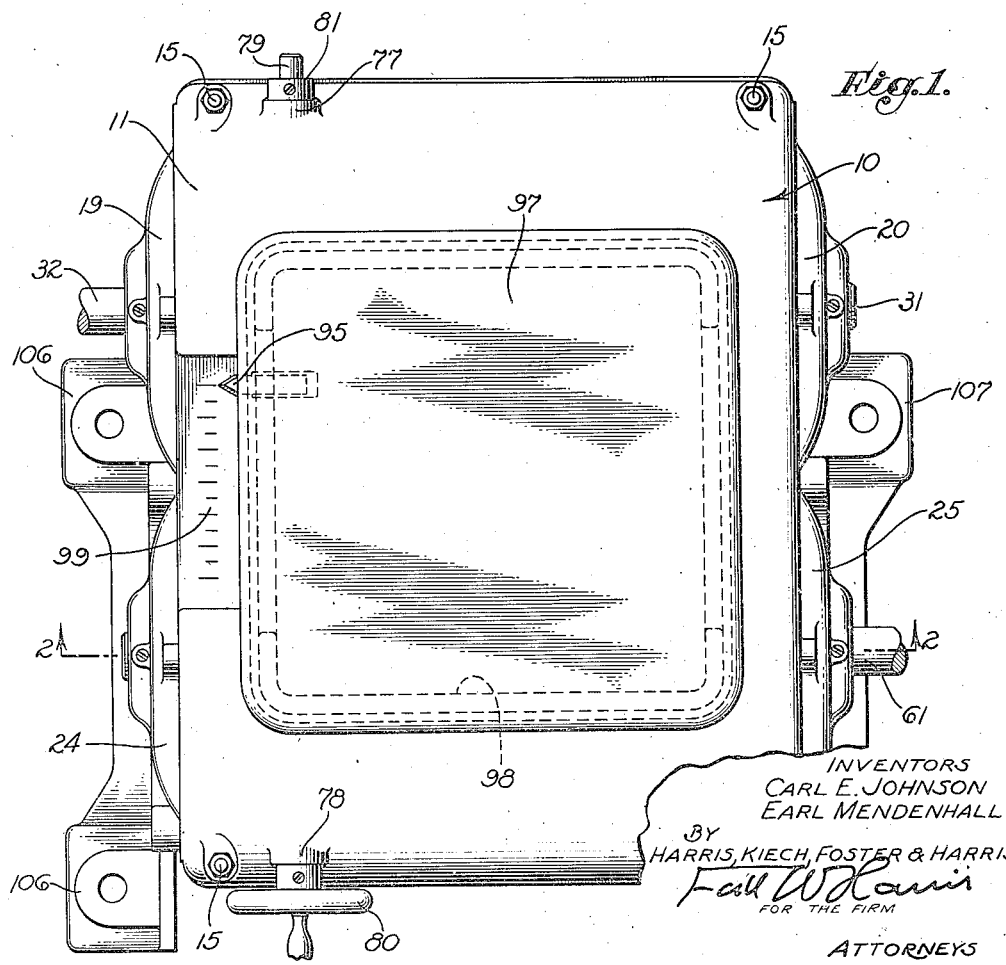
INVENTORS
CARL E. JOHNSON
EARL MENDENHALL
BY HARRIS, KIECH, FOSTER & HARRIS
FOR THE FIRM
ATTORNEYS INVENTORS
CARL E. JOHNSON
EARL MENDENHALL
BY HARRIS, KIECH, FOSTER & HARRIS
FOR THE FIRM
ATTORNEYS Patented Feb. 29, 1944

2,342,941

UNITED STATES PATENT OFFICE 2,342,941

ENCLOSED VARIABLE-SPEED TRANSMISSION

Carl E. Johnson, San Marino, and Earl Mendenhall, San Gabriel, Calif., assignors to Sterling Electric Motors, Inc., Los Angeles, Calif., a corporation of California Application April 9, 1941, Serial No. 387,644

11 Claims. (Cl. 74—230.17)

Our invention relates to the variable-speed transmission art, and more particularly to a variable-speed transmission of the variable-diameter V-belt pulley type.

A primary object of our invention is to provide such a transmission enclosed in a housing which is economical to construct and simple to assemble, and which may be readily adapted for installation in any one of several positions.

Another object of our invention is to provide such a variable-speed transmission including drive and driven shafts having belt-connected variable-diameter pulleys thereon and a novel type of adjusting means whereby the effective diameters of the pulleys on both shafts may be simultaneously oppositely adjusted to vary the speed ratio between the shafts.

A further object of the invention is to provide a transmission as described hereinabove in which a novel type of indicating means is provided to indicate on the exterior of the housing the speed ratio between the shafts therein.

Another object of our invention is to provide a transmission as described above including a plurality of variable-diameter pulleys on one of the shafts and a plurality of cooperating pulleys on the other shaft and including novel mechanism for interconnecting the variable-diameter pulleys for simultaneous adjustment.

Other objects and advantages will appear from the following description and the drawings, which are for the purpose of illustration only, and in which:

Fig. 1 is a plan view of the invention.

Fig. 4 is a vertical view, partly in section, taken on the line 4—4 of Fig. 2.

Figure 3:
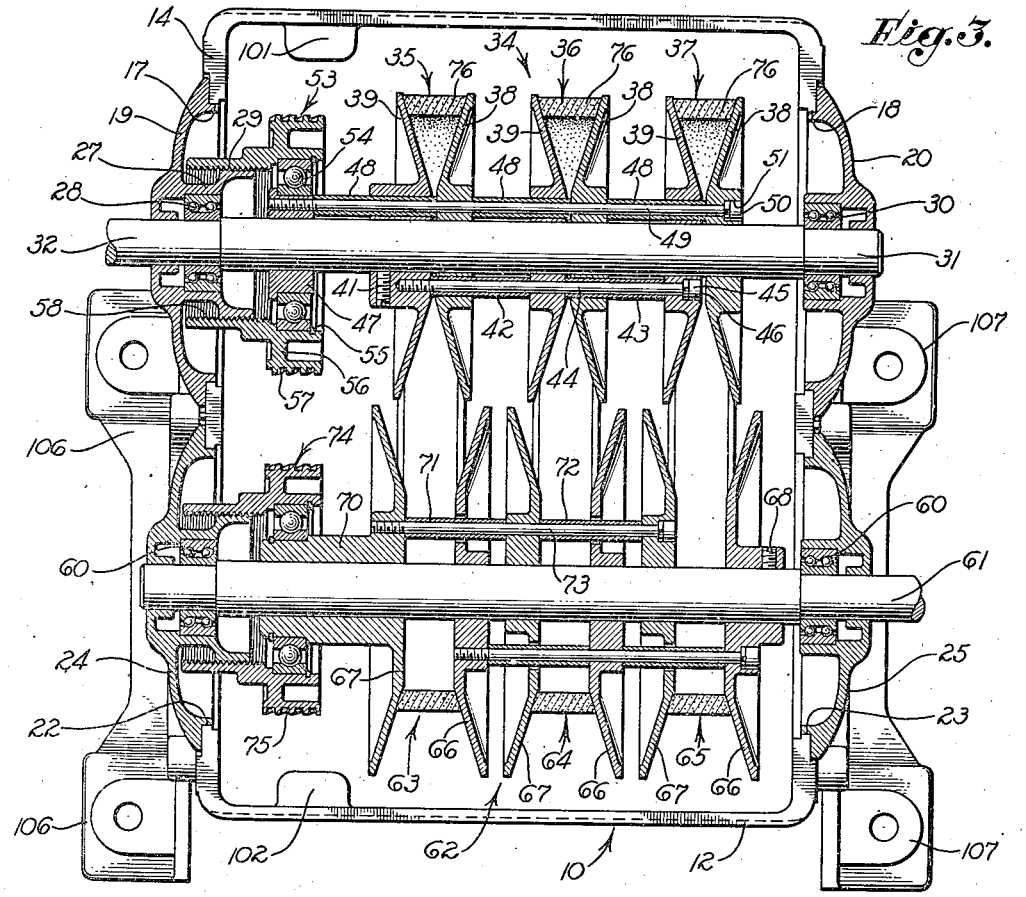
Fig. 3 is a horizontal sectional view taken on the line 3—3 of Fig. 2.

Referring to the drawings, we show a housing 10 comprised of an upper half 11 and a lower half 12, as best shown in Fig. 4. The upper and lower halves 11 and 12 of the housing 10 are preferably identical in construction for simplicity and economy in manufacture and assembly and for convenience in installation, as will be pointed out hereinafter. The upper and lower halves 11 and 12 are provided with engaging faces 13 and 14, and in the assembled position the halves are clamped rigidly together as by suitable bolts 15 indicated in Fig. 1.

The lower half 12 of the housing 10 is provided with a pair of semi-circular aligned openings 17 and 18 which mate with similar openings formed in the upper half 11 to receive cover plates 19 and 20, respectively. Similarly, the lower half 12 is provided with openings 22 and 23 which mate with similar openings formed in the upper half 11 to receive cover plates 24 and 25, respectively, the cover plates 19, 20, 24, and 25 being adapted to be rigidly secured to the housing 10 by suitable screws 21.

The cover plates 19 and 24 are identical in construction, and consequently only the former will be described in detail. The cover plate 19 is provided with a tubular extension 27 which extends into the housing 10 and which is counterbored to receive the outer race of a ball bearing unit 28, the inner end of the extension being provided with external threads 29. Similarly, the cover plates 20 and 25 are of identical construction, the cover plate 20 being provided with a ball bearing unit 30 therein. Journaled in the bearing units 28 and 30 is a drive shaft 31 having an end 32 projecting from the housing 10.

Carried on the drive shaft 31 is a drive pulley assembly 34 which includes drive pulleys 35, 36, and 37, each of which consists of a movable pulley flange 38 and a fixed pulley flange 39. As will be noted, the fixed pulley flange 39 of the drive pulley 35 is rigidly fixed to the drive shaft 31 by means of a setscrew 41. The fixed pulley flanges of the drive pulleys 35, 36, and 37 are spaced apart by means of spacer sleeves 42 and 43 which extend through suitable openings drilled in the movable flanges 38 of the pulleys 35 and 36, and the fixed flanges are rigidly clamped together by a screw rod 44 which is threaded into the fixed flange of the drive pulley 35 and has an outer head 45 which is received in a suitable recess 46 formed in the fixed flange 39 of the drive pulley 37 and passes through the spacer sleeves 42 and 43. Similarly, the movable flanges 38 are spaced from each other and from a bearing block 47, which journals the drive shaft 31, by aligned spacer sleeves 48 which extend through suitable openings formed in the fixed flanges 39, the movable flanges being clamped rigidly together by a screw rod 49 passing through the spacer sleeves 48, one end of which is threaded into the bearing block 47 and the outer end of which is provided with a head 50 received in a recess 51 formed in the movable flange 38 of the drive pulley 37. It will thus be appreciated that all of the movable flanges 38 are clamped rigidly together and to the bearing block 47, and that axial movement of the bearing block will cause axial movement of the movable flanges relative to the fixed flanges 39 to vary the effective diameter of the drive pulley assembly 34.

In order to provide axial movement of the bearing block and the consequent adjustment of the effective diameter of the drive pulley assembly 34, a drive pulley adjustment means 53 is provided and includes an annular bearing unit 54, the inner race of which is suitably fixed on the bearing block 47 and the outer race of which is fixed by means of a snap ring 55 in an actuating sleeve 56. The outer face of the actuating sleeve 56 is provided with gear teeth 57 preferably set at a 45° angle and forming a wide gear face, and the sleeve is also provided with an internally threaded portion 58 which is threaded on the threads 29 of the tubular extension 27 of the cover plate 19.

The cover plates 24 and 25 are similarly provided with bearings 60 which journal a driven shaft 61 which carries a driven pulley assembly 62 comprised of driven pulleys 63, 64, and 65, each of which is comprised of a fixed pulley flange 66 and a movable pulley flange 67. The fixed pulley flanges 66 are spaced apart and rigidly clamped together in the same general manner as the fixed flanges 39 of the drive pulley assembly 34, the fixed flange 66 of the driven pulley 65 being rigidly secured to the driven shaft 61 by means of a setscrew 68. The movable flange 67 of the driven pulley 63 is provided with a tubular hub 70, and the movable flanges 67 are spaced apart by means of spacer sleeves 71 and 72 and are clamped rigidly together by means of a screw rod 73 similar to the screw rod 44 in the drive pulley assembly 34. A driven pulley adjustment means 74 is provided between the tubular hub 70 and the extension on the cover plate 24, similarly to the drive pulley adjustment means 53, and is constructed and functions in the same manner so that a detailed description thereof may be omitted. It will be understood that the tubular hub 70 in the driven pulley assembly 62 is the full equivalent of the bearing block 47 of the drive pulley assembly 34, the driven pulley adjusting means 74 being provided with external gear teeth 75 similar to the gear teeth 57 of the drive pulley adjustment 53. Belts 76 operatively connect the drive and driven pulley assemblies 34 and 62.

Figure 2:
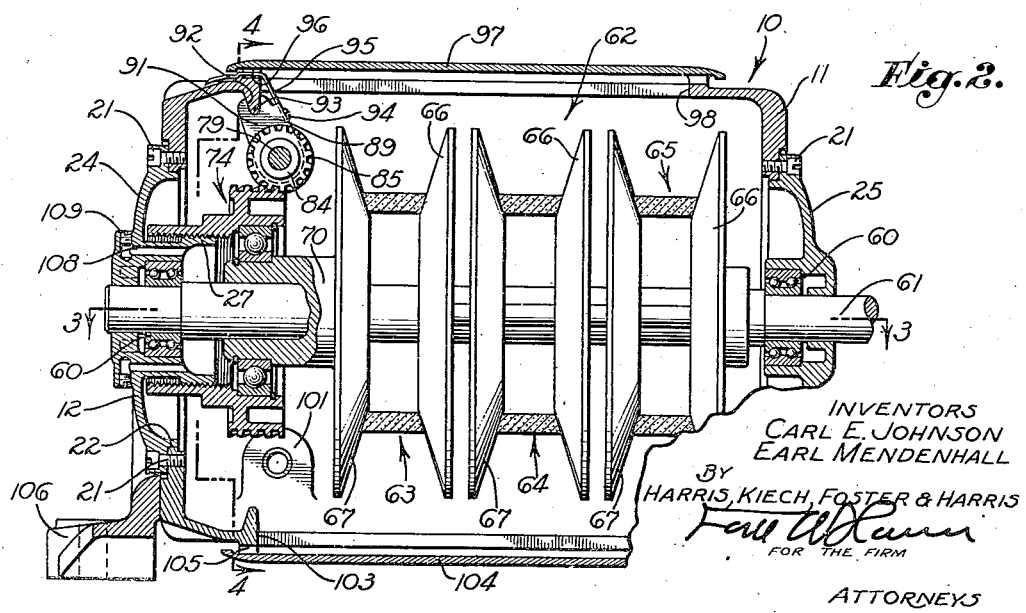
Fig. 2 is a vertical view, partly in section, taken on the line 2—2 of Fig. 1.

As best shown in Fig. 4, the upper half 11 of the housing 10 is provided with bearing bosses 77 and 78 which journal a control rod 79 on one end of which is carried a hand-wheel 80, and on the other end of which is provided a set collar 81 adapted to prevent axial movement of the control rod but permitting rotation thereof. A first gear collar 82 is suitably rigidly fixed to the control rod 79 and is formed with spiral gear teeth 83 thereon, set at a 45° angle, which engage with the gear teeth 57 of the drive pulley adjusting means 53. Also provided on the control rod 79 is a second gear collar 84 having spiral gear teeth 85 formed on the periphery thereof so as to engage the external gear teeth 75 of the driven pulley adjusting means 74, the gear teeth 85 likewise being set at 45° angle. The intermediate portion of the control rod 79 between the gear collars 82 and 84 is slightly enlarged and is externally threaded to receive a pair of stop collars 86 and 87 threaded thereon, each being provided with a stop lug 88. Threaded on the threaded portion of the control rod 79 is an indicator collar 89 having stop lugs 90 provided in each side thereof, each of which is adapted to engage one of the stop lugs 88. As best shown in Fig. 2, the indicator collar 89 has an upward projection 91 provided with a V-groove 92 which fits over a depending lip 93 formed on the upper half 11 of the housing 10. Secured to the upward projection 91, as by a screw 94, is an indicator arm 95 which extends out of the housing 10 through a longitudinal slot 96 formed in a top cover 97 adapted to normally close a top opening 98 formed in the upper half 11 of the housing 10. As best shown in Fig. 1, the outer end of the indicator arm 95 registers with a scale 99 formed on the upper surface of the upper half 11 of the housing 10, which scale may be calibrated in terms of the speed ratio between the drive and driven shafts 31 and 61, respectively. As will be apparent, rotation of the control rod 79 will move the indicator collar 89 axially along the control rod so as to change the position of the indicator arm 95 relative to the scale 99, the stop collars 86 and 87 limiting axial movement of the indicator collar. As will be apparent, by adjusting the positions of the stop collars 86 and 87 on the control rod 79, the degree of possible adjustment can be limited as desired.

As shown in Fig. 4, the lower half 12 of the housing 10 is likewise provided with bearing bosses 101 and 102 which are similar to the bearing bosses 77 and 78 and which may be alternatively used to support the control rod 79 and the mechanism associated therewith. As will also be noted from Fig. 2, the lower half 12 of the housing 10 is also provided with an opening 103, similar to the top opening 98, and which is adapted to be closed by a bottom cover plate 104, which is likewise provided with a longitudinal slot 105 through which the indicator arm 95 may be extended, and the exterior of the bottom half 12 is similarly provided with a scale identical with the scale 99. The lower half 12 of the housing 10 is provided with foot members 106 and 107 which are adapted to support the housing 10 and which may be fastened to any suitable base or support (not shown), although it is to be understood that the housing 10 may be inverted on the foot members without changing the operation of the device. This feature makes the construction adaptable for installation in any one of several positions.

In operation, rotation of the hand-wheel 80 causes a corresponding rotation of the control rod 79 and the gear collars 82 and 84 thereon. Rotation of the gear collar 82 causes rotation of the actuating sleeve 56 of the drive pulley adjusting means 53 by reason of the interengagement of the gear teeth 83 and the gear teeth 57, and since the actuating sleeve is threaded onto the tubular extension 27, rotation thereof causes the same to move axially. The use of the spiral gear teeth 83 and the mating angled gear teeth 57 permits the actuating sleeve 56 to move axially while engagement is maintained between the teeth, which is not possible with the conventional gear and worm construction, and this is a feature of the invention. Axial movement of the actuating sleeve 56 is transmitted through the annular bearing unit 54 to the bearing block 47 and from it to each of the movable pulley flanges 38 of the drive pulley assembly 34. Simultaneously with the operation of the drive pulley adjusting means 53, the gear collar 84 causes operation of the driven pulley adjusting means 74 through the interengagement of the gear teeth 75 and the spiral gear teeth 85. The drive pulley assembly 34 is so arranged that when the bearing block 47 moves to the right, as seen in Fig. 3, each of the movable flanges 38 will move away from its corresponding fixed flange 39, and upon similar rightward movement of the tubular hub 70 of the driven pulley assembly 62, the movable pulley flanges 67 will move toward the fixed pulley flanges 66. As will be understood by those skilled in the art, axial movement of the movable flanges 38 away from the fixed flanges 39 will decrease the effective diameter of the drive pulleys 35, 36, and 37, and a reverse axial movement of the movable flanges will increase the effective diameter of the drive pulleys. In the position shown in Fig. 3, the drive pulleys 35, 36, and 37 are adjusted to their maximum effective diameter. Similarly, axial movement of the movable flanges 67 relative to the fixed flanges 66 of the driven pulley assembly 62 will vary the effective diameter of the driven pulleys 63, 64, and 65 between maximum and minimum, they being shown in Fig. 3 in their position of minimum effective diameter. It is also to be noted that the driven pulley assembly 62 has driven pulleys of substantially greater diameter than the diameter of the drive pulleys in the drive pulley assembly 34 so as to provide a greater speed reduction between the drive and driven pulley assemblies. Consequently, it may be desirable in practice to vary the effective diameter of the drive pulley assembly at a different rate than at which the effective diameter of the driven pulley assembly is varied, so as to compensate for the differences in diameter of the pulley assemblies. This may be readily done by forming the gear teeth 83 and 85 with different pitches, or by varying the number of gear teeth 57 relative to the number of gear teeth 75.

The cover plates 19 and 24 are provided with lubricating means adapted to lubricate the pulley adjustment means and the bearings 28 and 60, respectively, retained therein. For this purpose, as shown in Fig. 2, a lubricant passage 108 is provided in each of the cover plates 19 and 24, the outer end of which is closed by a screw plug 109. By removing the screw plug 109, lubricant may be forced through the lubricant passage 108 into the interior of the tubular projection 27, from which it readily works into the bearings 28 and 60, the bearings 54, and between the threads 29 and 58. By this feature, the main bearings in the cover plates 19 and 24 and the adjustment means associated therewith may both be lubricated by a single source of lubricant.

Although we have shown and described a preferred embodiment of our invention, it will be understood that certain parts and elements thereof may be replaced by other parts and elements having the same function and method of operation, and therefore we do not intend to be limited to the specific construction shown, but desire to be afforded the full scope of the following claims.

We claim as our invention:

1. In a variable-speed transmission, the combination of: a drive shaft; a driven shaft; means for supporting said shafts in spaced relation; a drive pulley structure on said drive shaft; a driven pulley structure on said driven shaft, one of said structures being of the variable-diameter V-type including a pair of flanges one of which is axially movable relative to the other; belt means operatively connecting said structures; a stationary tubular flange member axially aligned with said variable-diameter pulley structure, said tubular flange member being provided with a threaded portion; a tubular element threaded to said threaded portion and having gear teeth formed integrally thereon, said tubular element being axially movable in response to rotation thereof; bearing means connecting said tubular element and the movable flange of said variable-diameter pulley structure; a spiral gear connected to said gear teeth so as to rotate said tubular element to move the same bodily axially in response to rotation of said spiral gear so as to vary the effective diameter of said variable-diameter pulley; and actuating means for rotating said spiral gear.

2. In a variable-speed transmission, the combination of: a drive shaft; a driven shaft; means for supporting said shafts in spaced relation; a drive pulley structure on said drive shaft; a driven pulley structure on said driven shaft, one of said structures being of the variable-diameter V-type including a pair of flanges one of which is axially movable relative to the other; belt means operatively connecting said structures; a tubular flange member axially aligned with said variable-diameter pulley structure, said tubular flange member being provided with a threaded portion; a tubular element threaded to said threaded portion and having gear teeth formed integrally thereon presenting a relatively wide gear face, said tubular element being axially movable in response to rotation thereof; bearing means connecting said tubular element and the movable flange of said variable-diameter pulley structure; a spiral gear connected to said gear teeth so as to rotate said tubular element to move the same bodily axially in response to rotation of said spiral gear so as to vary the effective diameter of said variable-diameter pulley, said gear teeth being adapted to maintain said tubular element in operative engagement with said spiral gear throughout a substantial axial movement of said tubular element relative to said spiral gear; and actuating means for rotating said spiral gear.

3. In a variable-speed transmission, the combination of: a housing; a drive shaft in said housing; a driven shaft in said housing; a drive pulley structure on said drive shaft; a driven pulley structure on said driven shaft, one of said pulley structures being of the variable-diameter V-type including a pair of flanges one of which is axially movable relative to the other; belt means operatively connecting said pulley structures; an opening in said housing aligned with the axis of said variable-diameter pulley structure; a cover plate secured to said housing so as to close said opening; bearing means on said cover plate adapted to journal one end of the shaft on which said variable-diameter pulley is disposed; adjustment means in said housing and threaded to said cover plate and removable from said housing with said cover plate, said adjustment means being operatively connected to said movable flange so as to move the same axially to vary the effective diameter of said variable-diameter pulley structure in response to rotation of said adjustment means; actuating means for rotating said adjustment means; and lubricating means carried by said cover plate for lubricating said bearing means and said adjustment means.

4. In a variable-speed transmission, the combination of: a housing; a first shaft in said housing; a second shaft in said housing; a variable-diameter pulley structure of the V-type on said first shaft, including a pair of flange members one of which is axially movable relative to the other; a pulley structure on said second shaft;

belt means operatively connecting said pulley structures; a pair of aligned openings in said housing; a first removable cover plate closing one of said openings; a second removable cover plate closing the other of said openings; bearing means carried by said first cover plate and journaling one end of said first shaft; bearing means carried by the other of said cover plates and journaling the other end of said first shaft; adjustment means threaded on one of said cover plates and operatively connected to said movable flange and adapted to be rotated to move said movable flange axially to vary the effective diameter of said variable-diameter pulley structure; and rotating means for actuating said adjustment means.

5. In a variable-speed transmission, the combination of: a housing having an opening in one side thereof; a shaft in said housing axially aligned with said opening; a variable-diameter pulley of the V-type on said shaft including a pair of flanges one of which is axially movable relative to the other; a cover plate adapted to close said opening and having a threaded tubular member extending into said housing; a tubular element threadedly carried by said tubular member and axially movable in response to rotation thereof; annular gear teeth on said tubular element and fixed against axial movement relative thereto; means for connecting said tubular element with said movable flange so that axial movement of said tubular element causes axial movement of said movable flange; and actuating means operatively connected to said gear teeth for rotating said tubular element to move the same axially.

6. In a variable-speed transmission, the combination of: a housing having an opening in one side thereof; a shaft in said housing axially aligned with said opening; a variable-diameter pulley of the V-type on said shaft including a pair of flanges one of which is axially movable relative to the other; a cover plate adapted to close said opening and having a threaded tubular member extending into said housing; first bearing means in said housing opposite to said opening for supporting one end of said shaft; second bearing means carried by said cover plate for supporting the other end of said shaft; a tubular element threadedly carried by said tubular member and axially movable in response to rotation thereof; annular gear teeth on said tubular element and fixed against axial movement relative thereto; means for connecting said tubular element with said movable flange so that axial movement of said tubular element causes axial movement of said movable flange; and actuating means operatively connected to said gear teeth for rotating said tubular element to move the same axially.

7. In a variable-speed transmission, the combination of: a housing having an opening in one side thereof; a shaft in said housing axially aligned with said opening; a variable-diameter pulley of the V-type on said shaft including a pair of flanges one of which is axially movable relative to the other; a cover plate adapted to close said opening and having a threaded tubular member extending into said housing; a tubular element threadedly carried by said tubular member and axially movable in response to rotation thereof, said tubular element having gear teeth fixed thereon; a spiral gear connected to said gear teeth so that rotation of said gear causes rotation of said tubular element; and actuating means for rotating said spiral gear.

8. In a variable-speed transmission, the combination of: a housing having an opening in one side thereof; a shaft in said housing axially aligned with said opening; a variable-diameter pulley of the V-type on said shaft including a pair of flanges one of which is axially movable relative to the other; a cover plate adapted to close said opening and having a threaded tubular member extending into said housing; a tubular element threadedly carried by said tubular member and axially movable in response to rotation thereof, said opening being sufficiently large to permit the removal from said housing of said tubular element with said cover plate as a unit; gear teeth on said tubular element and fixed against axial movement relative thereto; means for connecting said tubular element with said movable flange so that axial movement of said tubular element causes axial movement of said movable flange; and actuating means operatively connected to said gear teeth for rotating said tubular element to move the same axially.

9. In a variable-speed transmission, the combination of: a housing having an opening in one side thereof; a shaft in said housing axially aligned with said opening; a variable-diameter pulley of the V-type on said shaft including a pair of flanges one of which is axially movable relative to the other; a cover plate adapted to close said opening and having a threaded tubular member extending into said housing; first bearing means in said housing opposite to said opening for supporting one end of said shaft; second bearing means carried by said cover plate for supporting the other end of said shaft; a tubular element threadedly carried by said tubular member and axially movable in response to rotation thereof, said cover plate, tubular element, and second bearing means being removable as a unit from said housing through said opening; gear teeth on said tubular element and fixed against axial movement relative thereto; means for connecting said tubular element with said movable flange so that axial movement of said tubular element causes axial movement of said movable flange; and actuating means operatively connected to said gear teeth for rotating said tubular element to move the same axially.

10. In a variable-speed transmission, the combination of: a housing having a pair of spaced side walls, each of said walls having an opening therein; a first cover plate adapted to close one of said openings; bearing means carried by said first cover plate; a second cover plate adapted to close the other of said openings, said second cover plate having a threaded tubular member extending into said housing; bearing means carried by said second cover plate; a shaft rotatably supported by said bearing means; a variable-diameter pulley of the V-type on said shaft including a pair of flanges one of which is axially movable relative to the other; a tubular element threadedly carried by said tubular member and axially movable in response to rotation thereof; gear teeth on said tubular element and fixed against axial movement relative thereto; means for connecting said tubular element with said movable flange so that axial movement of said tubular element causes axial movement of said movable flange; and actuating means operatively connected to said gear teeth for rotating said tubular element to move the same axially.

11. In a variable-speed transmission, the combination of: a housing having an opening in one side thereof; a shaft in said housing axially aligned with said opening; a variable-diameter pulley of the V-type on said shaft including a pair of flanges one of which is axially movable relative to the other; a cover plate adapted to close said opening and having a tubular member rigidly associated therewith and extending into said housing, said tubular member having an internal bearing-supporting annular channel and being externally threaded adjacent its inner end; annular bearing means carried in said channel and rotatably supporting one end of said shaft; a tubular element threadedly carried by said tubular member and axially movable in response to rotation thereof; spiral gear teeth on said tubular element and fixed against movement relative thereto; bearing means connecting said tubular element with said movable flange; and an actuating gear operatively connected to said gear teeth for rotating said tubular element, said gear teeth moving across the face of said actuating gear upon rotation of said tubular element.

CARL E. JOHNSON.
EARL MENDENHALL.

CERTIFICATE OF CORRECTION.

Patent No. 2,342,941. February 29, 1944.

CARL E. JOHNSON, ET AL.

It is hereby certified that error appears in the printed specification of the above numbered patent requiring correction as follows: Page 4, first column, line 15, claim 4, for "rotating means for actuating" read --actuating means for rotating--; and that the said Letters Patent should be read with this correction therein that the same may conform to the record of the case in the Patent Office.

Signed and sealed this 23rd day of May, A. D. 1944.

Leslie Frazer

(Seal) Acting Commissioner of Patents.